March 30, 1954    N. F. RAEDER    2,673,399
SECTIONAL SCALE
Filed Sept. 8, 1952
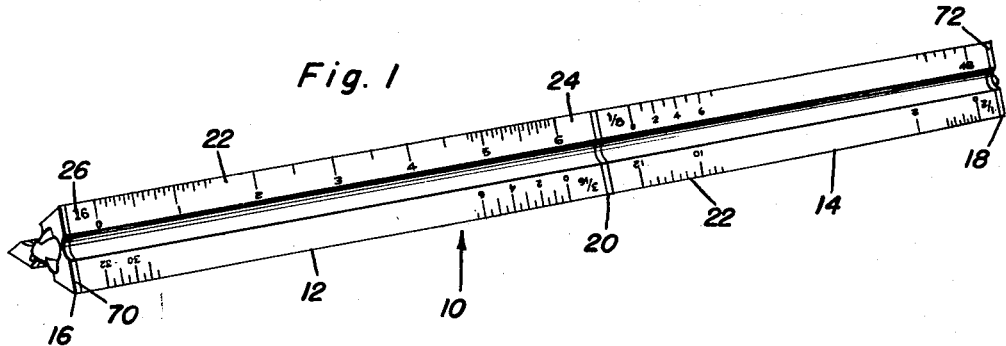
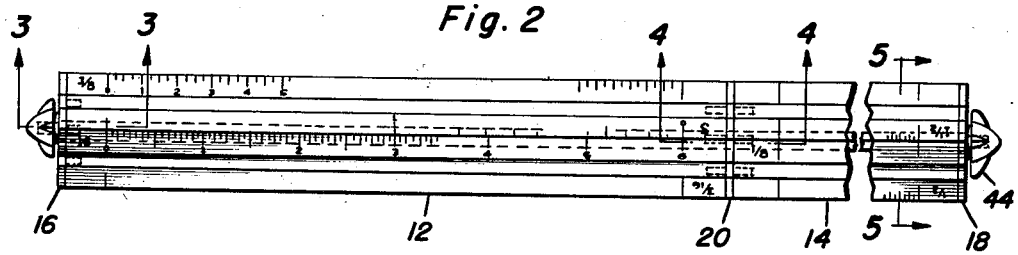
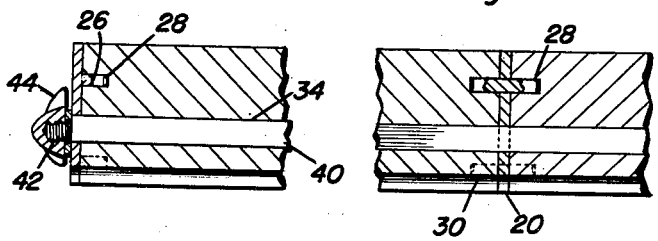
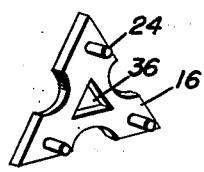
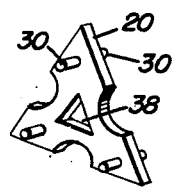
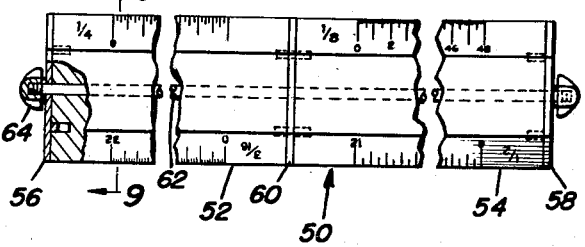
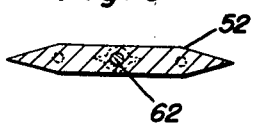
Nathaniel F. Raeder
INVENTOR.

Patented Mar. 30, 1954

2,673,399

UNITED STATES PATENT OFFICE 2,673,399

SECTIONAL SCALE

Nathaniel F. Raeder, Clarksburg, W. Va.

Application September 8, 1952, Serial No. 308,401

7 Claims. (Cl. 33—107)

This invention relates to a sectional scale and particularly to a scale having a plurality of proportionate scales thereon and means for mounting the various scales as is desired.

Engineers, architects and others who use or construct drawings proportionate to scale, utilize so-called proportionate or ratio scales in order to determine from the drawing the exact dimensions of the article or to construct drawings in proportion to the dimension of an article. Heretofore, it has been customary to provide so-called architectural or engineers' scales usually of triangular formation but also of flat or square section with a plurality of proportionate scales thereon. In utilizing such scales it is customary to use scales of different proportions or ratios one to measure one drawing and another to measure another or one to measure the object and one to measure the drawing. In utilizing such scales a great deal of time is lost in searching for and applying the various scales that are needed. It being found that almost always the scale must be turned over or reversed in order to use the second scale desired.

In a scale according to the invention the various proportions of scales are placed on different sections which may be adjustably secured with relation to each other so that two desired scales may be arranged in end to end relation and be secured thereagainst so that in the use of the scales it will not be necessary to turn the scale during the operation but the two scales being utilized simultaneously are always available and indicia will always indicate which scales are in use.

It is accordingly an object of this invention to provide an improved scale.

It is a further object of the invention to provide a sectionalized scale having a plurality of scales in section for selectively placing the scales in conjunction with each other.

It is a further object of the invention to provide an adjustable scale having means for indicating the scale groups.

Other objects and many of the attendant advantages of the present invention will be apparent from the following detailed description taken in conjunction with the accompanying drawings in which:

Figure 1 is a perspective view of the sectionalized scale according to the invention;

Figure 2 is an elevation of the scale;

Figure 3 is a sectional elevational view through one end of the scale and taken substantially on the plane indicated by the line 3—3 of Figure 2 and showing the adjustment of an end plate on the scale;

Figure 4 is a sectional elevation through the adjusting plate taken substantially on the plane indicated by the line 4—4 of Figure 2 and showing the manner of adjusting the two sections in fixed relation to each other;

Figure 5 is a cross-section taken substantially on the plane indicated by the line 5—5 of Figure 2;

Figure 6 is a perspective view of the end plate of the scale;

Figure 7 is a perspective view of the adjusting plate;

Figure 8 is a plan view of the modification utilizing a flat scale with parts broken away and in section;

Figure 9 is a cross section of the scale taken substantially on the plane indicated by line 9—9 of Figure 8; and Figure 10 is a perspective view of the adjusting plate of the scale.

In the exemplary embodiment of the invention, the scale 10 is composed of a plurality of sections herein indicated as two sections 12 and 14 adapted to be arranged in longitudinal relation to each other with the scales forming a continuation or continuous line when the scales are properly adjusted. Sections 12 and 14 are provided with end plates 16 and 18 and an adjustment plate 20 intermediate the sections 12 and 14. Each of the scale sections is provided with a plurality of scales 22 which may be identical on each of the scales or each of the sections may have a group of scales to cooperate with a group of scales on the other section or sections.

The end plates 16 and 18 are provided with projecting pins 26 which are adapted to be received in apertures 28 in the ends of the sections 12 and 14. Likewise the adjusting plate 20 is provided with pins 30 which are identical with the pins 26 except that they extend in opposite directions from the plate. The pins 26 and 30 are identical in location so that either end of the sections 12 and 14 may be applied to the adjusting plate 20 and have the end plates 16 and 18 applied thereto. Scales 22 are preferably of less length than the sections 12 and 14 so that blank spaces 24 and 26 appear between the ends of the scales 22 and the ends of the sections. The end plates and the adjusting plate, 16, 18 and 20 are of identical cross-section with the sections 12 and 14 so that the metal end sections as well as the adjusting section 20 protect the ends of the sections to prevent unnecessary wear thereon. The sections 12 and 14 are provided with a longitudinally extending aperture 34 and the end plates 16 and 18 are provided with corresponding apertures 36 and the adjusting plate 20 is likewise provided with an aperture 38 all in alignment with the apertures 34 of the sections 12 and 14. An adjusting rod 40 extends through the aperture 34 which is preferably of an out of round shape herein indicated as being triangular in cross-section. The ends of the rod 40 are provided with threaded connections 42 on which are applied wing nuts 44.

The sectionalized scale shown in Figures 1 to 7 have been of the triangular or so-called engineers' or architects' scales and the scales thereon are of the usual type having a plurality of proportionate scales so that the scales may be applied to drawings or articles of one dimension and another portion of the scales utilized to create a drawing or measure articles of another dimention.

In the modification according to Figures 8 to 10 inclusive the scale is of the flat type and will therefore have only four cooperating scales on each of the sections. The flat scale 50 is provided with a plurality of sections herein indicated as sections 52 and 54 having end plates 56 and 58 which conform to the cross-sectional area of the flat scale 50 and a connecting plate 60 which likewise conforms to the cross-sectional area of the flat scale 50. An adjusting rod 62 extends longitudinally through the scales and preferably is of a round or rod-like construction and is secured in place by means of a wing nut 64.

In the operation of the scale according to Figures 1 to 7, one of the wing nuts 44 is removed from the threaded section 42 and the sections removed from the rod 40 and the scales aligned in proper position so that a chosen pair of scales will be in alignment. The end plates 16 and 18 and preferably also the adjusting plate 20 will have one edge provided with indicia 72 preferably of a color differentiating that edge of the plates 16, 18 and 20 from the remaining edges of the plate. The edges of the plate bearing the indicia will be arranged adjacent to the juxtaposed selected scales so that in use the scale will always be in identifying relation to the scales so that the operator can tell at a glance whether the proper scale is up and since the scales to be used are arranged in juxtaposed position there will be no necessity of turning and looking for the scale to be used.

It will be apparent that the present invention provides a scale which may be arranged with suitable scales in end to end relation and thus save the time necessary in reversing and checking on the scales to be used.

It will likewise be apparent that the utilization of the indicia on the plates will save material time in checking the scales to be utilized.

For purposes of exemplification a particular embodiment of the invention has been shown, and described according to the best present understanding thereof. It will be apparent to those skilled in the art that changes and modifications can be made therein without departing from the true spirit of the invention.

Having described the invention, what is claimed as new is:

1. A proportionate scale comprising a plurality of sections of substantially similar cross section, a pair of end plates, a plurality of pins extending inward from said end plates, said sections having apertures at each end adapted to receive said pins, an adjusting plate, a plurality of pins extending each way from said adjusting plate, said pins being positioned for engagement with the apertures in the ends of said sections, said pins and said apertures being symmetrically arranged whereby any face of one of said sections may be arranged in alignment with any face of an adjoining section.

2. A proportionate scale comprising a plurality of sections of substantially similar cross section, a pair of end plates, a plurality of pins extending inward from said end plates, said sections having apertures at each end adapted to receive said pins, an adjusting plate, a plurality of pins extending each way from said adjusting plate, said pins being positioned for engagement with the apertures in the ends of said sections, said pins and said apertures being symmetrically arranged with respect to each other whereby any face of one of said sections may be arranged in alignment with any face of an adjoining section, said sections and said plates having a longitudinal aperture therethrough, a rod in said apertures, fastening means locking said rod and said sections together.

3. A proportionate scale comprising a plurality of sections of substantially similar cross section, a pair of end plates, a plurality of pins extending inward from said end plates, said sections having apertures at each end adapted to receive said pins, an adjusting plate, a plurality of pins extending each way from said adjusting plate, said pins being positioned for engagement with the apertures in the ends of said sections, said pins and said apertures being symmetrically arranged whereby said sections may be arranged in any desired end to end relation with any face of one of said sections arranged in alignment with any face of an adjoining section, fastening means locking said sections together, indicia on one side of said plates, said plates being arranged to indicate the aligned faces of said sections.

4. A proportionate scale comprising a plurality of sections of substantially similar cross section, a pair of end plates, a plurality of symmetrically arranged pins extending inward from said end plates, said sections having symmetrically arranged apertures at each end adapted to receive said pins, a coupling plate, a plurality of pins extending each way from said coupling plate, said pins being positioned for engagement with the apertures in the ends of said sections, said sections and said plates being capable of assembly with any scale of any section in alignment with any scale of an adjacent section and any side of said plates being aligned with said selected scales, said sections and said plates having a longitudinal aperture therethrough, a rod in said apertures, fastening means locking said rod and said sections together, indicia on one side of said plates, said apertures and said rod being triangular in cross section.

5. A proportionate scale comprising a plurality of sections of substantially similar cross section, each of said sections having a plurality of proportionate scales thereon, each end of said sections having a group of similarly and symmetrically arranged longitudinally extending apertures, a coupling plate, oppositely extending pins on said coupling plate, said pins being arranged for reception in said apertures, said sections being selectively mounted on said coupling plate to align any scale on one section with any scale on the adjacent section.

6. A proportionate scale comprising a plurality of sections of substantially similar cross section, each of said sections having a plurality of proportionate scales thereon, each end of said sections having a group of similarly and symmetrically arranged longitudinally extending apertures, a coupling plate, oppositely extending pins on said coupling plate, said pins being arranged for reception in said apertures, said sections being selectively mounted on said coupling plate to align any scale on one section with any scale on the adjacent section, a pair of end plates, said end plates including pins receivable in said apertures, said end plates, said coupling plate and said sections having apertures providing an aligned passage through the assembled scale, a fastening means extending through said passage to retain said scale in assembled relation.

7. A proportionate scale comprising a plurality of sections of substantially similar cross section, each of said sections having a plurality of proportionate scales thereon, each end of said sections having a group of similarly and symmetrically arranged longitudinally extending apertures, a coupling plate, oppositely extending pins on said coupling plate, said pins being arranged for reception in said apertures, said sections being selectively mounted on said coupling plate to align any scale on one section with any scale on the adjacent section, a pair of end plates, said end plates including pins receivable in said apertures, said end plates, said coupling plate and said sections having apertures providing an aligned passage through the assembled scale, a fastening means extending through said passage to retain said scale in assembled relation, indicia on said end plates, said end plates being selectively positioned to align said indicia with said aligned proportionate scales.

NATHANIEL F. RAEDER.

References Cited in the file of this patent

UNITED STATES PATENTS

| Number | Name | Date |
|---|---|---|
| 418,968 | Benzinger | Jan. 7, 1890 |
| 979,234 | Westcott | Dec. 20, 1910 |
| 1,205,946 | Lyons | Nov. 21, 1916 |
| 1,276,565 | Paschall | Aug. 20, 1918 |

FOREIGN PATENTS

| Number | Country | Date |
|---|---|---|
| 453,368 | Great Britain | Sept. 10, 1936 |
| 588,472 | Great Britain | May 22, 1947 |